(12) United States Patent
Poulsen

(10) Patent No.: US 11,627,730 B1
(45) Date of Patent: Apr. 18, 2023

(54) METHOD OF HARVESTING CRUSTACEANS

(71) Applicant: Kris Poulsen and Associates, LLC, Shoreline, WA (US)

(72) Inventor: Edward Poulsen, Shoreline, WA (US)

(*) Notice: Subject to any disclaimer, the term of this patent is extended or adjusted under 35 U.S.C. 154(b) by 315 days.

(21) Appl. No.: 17/116,444

(22) Filed: Dec. 9, 2020

Related U.S. Application Data

(63) Continuation-in-part of application No. 16/057,030, filed on Aug. 7, 2018, now Pat. No. 10,881,087.

(60) Provisional application No. 62/542,272, filed on Aug. 7, 2017.

(51) Int. Cl.
| | | |
|---|---|---|
| *A01K 69/06* | (2006.01) | |
| *A01K 69/00* | (2006.01) | |
| *A01K 69/08* | (2006.01) | |
| *A01K 79/00* | (2006.01) | |
| *A01K 85/01* | (2006.01) | |
| *A01K 97/02* | (2006.01) | |
| *A01K 99/00* | (2006.01) | |
| *H04N 5/235* | (2006.01) | |
| *H04N 7/18* | (2006.01) | |
| *G06V 40/20* | (2022.01) | |
| *G03B 15/05* | (2021.01) | |

(52) U.S. Cl.
CPC .......... *A01K 69/06* (2013.01); *A01K 69/00* (2013.01); *A01K 69/08* (2013.01); *A01K 79/00* (2013.01); *A01K 85/01* (2013.01); *A01K 97/02* (2013.01); *A01K 99/00* (2013.01); *G06V 40/20* (2022.01); *H04N 5/2354* (2013.01); *H04N 7/183* (2013.01); *G03B 15/05* (2013.01)

(58) Field of Classification Search
CPC ........ A01K 69/00; A01K 69/06; A01K 69/08; A01K 69/10; A01K 79/00; A01K 85/01; A01K 97/02; A01K 99/00; G06V 40/20; H04N 5/2354; H04N 7/183; G03B 15/05
USPC .............................. 43/4, 4.5, 17.5, 100, 105
See application file for complete search history.

(56) References Cited

U.S. PATENT DOCUMENTS

| | | | | |
|---|---|---|---|---|
| 8,553,501 B1* | 10/2013 | Cota | ...................... | A01K 69/00 43/100 |
| 9,091,550 B1* | 7/2015 | Smith | ..................... | A01K 69/00 |
| 9,814,226 B2* | 11/2017 | Opshaug | ................ | A01K 69/08 |
| 10,111,411 B2* | 10/2018 | Garland | ................. | A01K 61/90 |
| 2013/0109259 A1* | 5/2013 | Abulrassoul | ........... | A01K 69/06 441/11 |
| 2013/0167428 A1* | 7/2013 | Alhuwaishel | .......... | A01K 69/06 43/58 |

* cited by examiner

Primary Examiner — Christopher D Hutchens
Assistant Examiner — Steven J Shur
(74) Attorney, Agent, or Firm — Timothy E. Siegel Patent Law, PLLC; Timothy E. Siegel

(57) ABSTRACT

A crustacean trap adapted to permit blocking entry to a crustacean of a protected species, including a cage, enclosing a volume and a crustacean entrance that can be closed to prevent entry, responsive to a first signal and opened to permit crustacean entry, responsive to a second signal received at the trap. Also, an image forming assembly includes a digital camera and a flash mechanism, the assembly being directed at an area immediately outside of the entrance and being tuned to return a maximum signal from crustaceans of the protected crustacean species so that a protected species crustacean appears as brightly lit in images formed, and being communicatively connected to a remote station that is equipped to receive-images from the assembly. Finally, there is a connector for connecting the cage to a signal source for receiving the first and second signals and for sending the images formed.

20 Claims, 3 Drawing Sheets

METHOD OF HARVESTING CRUSTACEANS

RELATED APPLICATIONS

This application is a continuation-in-part of application U.S. Ser. No. 16/057,030, filed Aug. 7, 2018, which itself claims benefit of provisional application U.S. Ser. No. 62/542,272 filed on Aug. 7, 2017, which is incorporated by referenced as if fully set forth herein.

BACKGROUND

Harvesting crustaceans is beset by many challenges. The typical technique, for crabs, is to lay out baited traps ("pots" for crab traps) in a loose grid of about 1 nautical mile between pots. This process can take a day, as the total route for laying out pots can be over 100 nautical miles. Then, the process of retrieving the pots begins, which is even more time consuming. As the pots are retrieved, difficult decisions must be made. For example, if a pot rich with crabs is found, the captain may decide to stop retrieving pots and begin laying pots out in a tighter grid, of about ⅛ nautical mile between pots, around the pot with multiple crabs inside, on the theory that a rich crab area has been found. This decision must be made, however, in ignorance of the catch in the not-yet-retrieved pots, one or more of which may have a crab harvest that is richer still. It is also made in ignorance of the length of time that has passed since the crabs inside were caught. If it has been more than a day, the school of crabs may have moved on. Another problem encountered is that of harvesting crabs in an area where there is a mix of crab species, particularly when one or more of the species is protected. In some instances, crabs in a protected species may be brought to the surface, but then must be released back into the ocean. In the instance of the Blue King Crab, however, the fisheries managing authority in Alaska has forbidden that this species even be brought to the ocean surface, effectively shutting down harvesting in areas that are rich in other crab species, such as the Pribilof Islands Red Crab.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method of harvesting crustaceans in an area where there is a protected crustacean species that utilizes a trap having a crustacean entrance that can be closed to prevent entry responsive to a signal received at the trap and an image forming assembly including a digital camera and a flash mechanism, the assembly being directed at an area immediately outside of the entrance and being tuned to return a maximum signal from crustaceans of the protected crustacean species so that a protected species crustacean appears as brightly lit in images returned. Also, the method uses a communications assembly connecting the trap to a remote station that is equipped to receive images from the assembly. In the method, the trap is laid in the ocean and the flash mechanism is used to repeatedly light the area immediately outside of the entrance and images are formed with the digital camera and are sent to the remote station. The images are monitored, and an analysis is performed at the remote station, to determine if a crustacean of a protected crustacean species is approaching the trap. Finally, in reliance on the images, when a crustacean of the protected crustacean species is detected in the area, sending the signal to the trap so that the entrance is closed, thereby preventing the protected crustacean from entering the trap.

In a second separate aspect, the present invention may take the form of a crustacean trap adapted to permit blocking entry to a crustacean of a protected species, including a cage, enclosing a volume and a crustacean entrance that can be closed to prevent entry, responsive to a first signal and opened to permit crustacean entry, responsive to a second signal received at the trap. Also, an image forming assembly includes a digital camera and a flash mechanism, the assembly being directed at an area immediately outside of the entrance and being tuned to return a maximum signal from crustaceans of the protected crustacean species so that a protected species crustacean appears as brightly lit in images formed, and being communicatively connected to a remote station that is equipped to receive-images from the assembly. Finally, there is a connector for connecting the cage to a signal source for receiving the first and second signals and for sending the images formed.

In a third separate aspect, the present invention may take the form of a system for catching permitted crustaceans and avoiding catching protected crustaceans, including a crustacean trap adapted to permit blocking entry to a crustacean of a protected species, including a cage, enclosing a volume and having a crustacean entrance that can be closed to prevent entry, responsive to a first signal and opened to permit crustacean entry, responsive to a second signal received at the trap. Also, an image forming assembly includes a digital camera and a flash mechanism, the assembly being directed at an area immediately outside of the entrance and being tuned to return a maximum signal from crustaceans of the protected crustacean species so that a protected species crustacean appears as brightly lit in images formed. In addition, a remote station is adapted to permit analysis of the images and for sending the first and second signals, responsive to the analysis. Finally, a communications assembly permits images from the image forming assembly to be sent to the remote station and first signals and second signals to be received from the remote station.

In addition to the exemplary aspects and embodiments described above, further aspects and embodiments will become apparent by reference to the drawings and by study of the following detailed descriptions.

DETAILED DESCRIPTION OF PREFERRED EMBODIMENTS

Exemplary embodiments are illustrated in referenced drawings. It is intended that the embodiments and figures disclosed herein are to be considered illustrative rather than restrictive.

In a first preferred method, a crab harvest system is provided that includes traps and buoys, with each trap electrically communicating to a buoy. In one embodiment, the trap and the buoy are connected with an electrical-conductive wire, whereas in another the communicative link is a sonar link. Also, each trap includes a digital camera and a light flash mechanism, and each buoy is equipped with a wireless broadcast mechanism, capable of forwarding digital images taken by the digital camera to a further location, typically on the boat that initially holds the traps. In one embodiment, the buoy forwards the image signal to the boat directly, whereas in another embodiment the further location is shore based and a shore-based person evaluates the images and directs or advises the boat crew.

In the first preferred method, the traps are laid out in a grid having a first grid spacing of between one-half nautical mile and one and a half nautical miles. This process is continued until all of the traps are laid out, or an initial set of traps set to be laid out is all laid out, or until a decision is made to stop laying out the traps. After a trap is laid out, it begins to repeatedly light the trap with the light trap mechanism and send images to the buoy, which relays the to the further location where they are examined by a person. In one embodiment, the images are formed periodically, on the order of one every hour, for each trap. In another embodiment, the person monitoring the images can command that an image be taken, and the images are taken (including the use of the flash) on command from this person. In a preferred embodiment, a computer program is used to evaluate the images, in one variant using artificial intelligence.

At any time, before or after the grid is completed, a decision may be made to lay down the traps in a grid having a second grid spacing, tighter than the first, in an area that has been found to be rich in crabs. In a preferred embodiment, the second grid spacing is between one tenth and one sixth of a nautical mile between traps. This decision may be made by a person viewing the images from the traps and may be made before the initial grid is entirely laid out. The human user may base his decision on recent information on crab harvesting in the area, so that if an unusually large number of crabs are found in the first ten traps laid out, that may cause a speedy reevaluation of plans, to lay traps in a tight grid, in this area. One advantage of making an early decision to lay traps in a tighter grid, is that there will be more traps still on board the vessel, when this decision is made.

Figure 1:
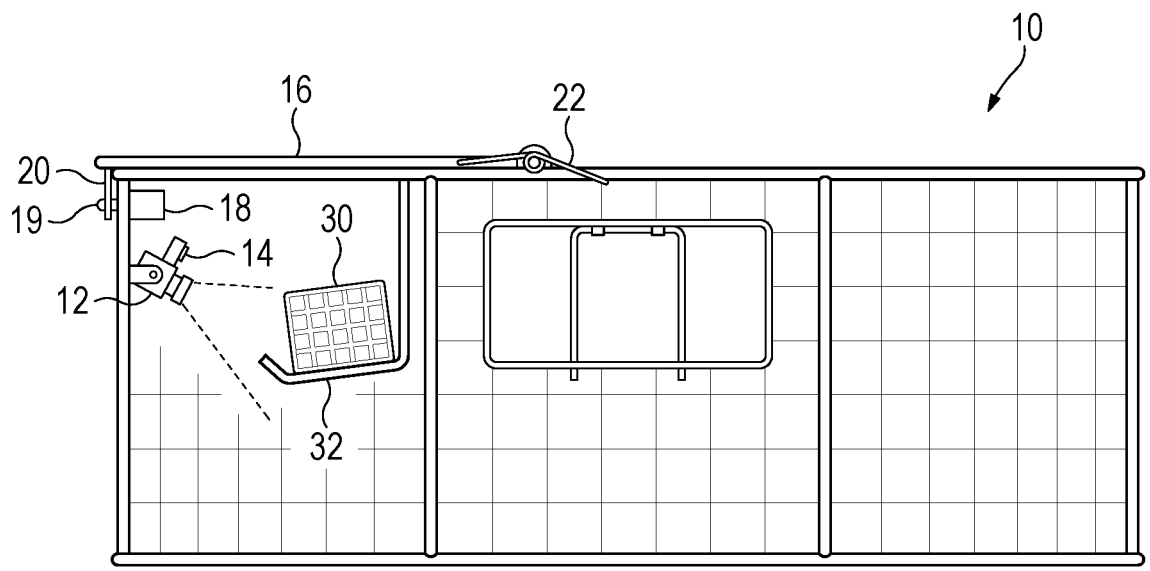
FIG. 1 is a side view of a marine life trap having a bait box, according to a preferred embodiment of the present invention.
Figure 2:
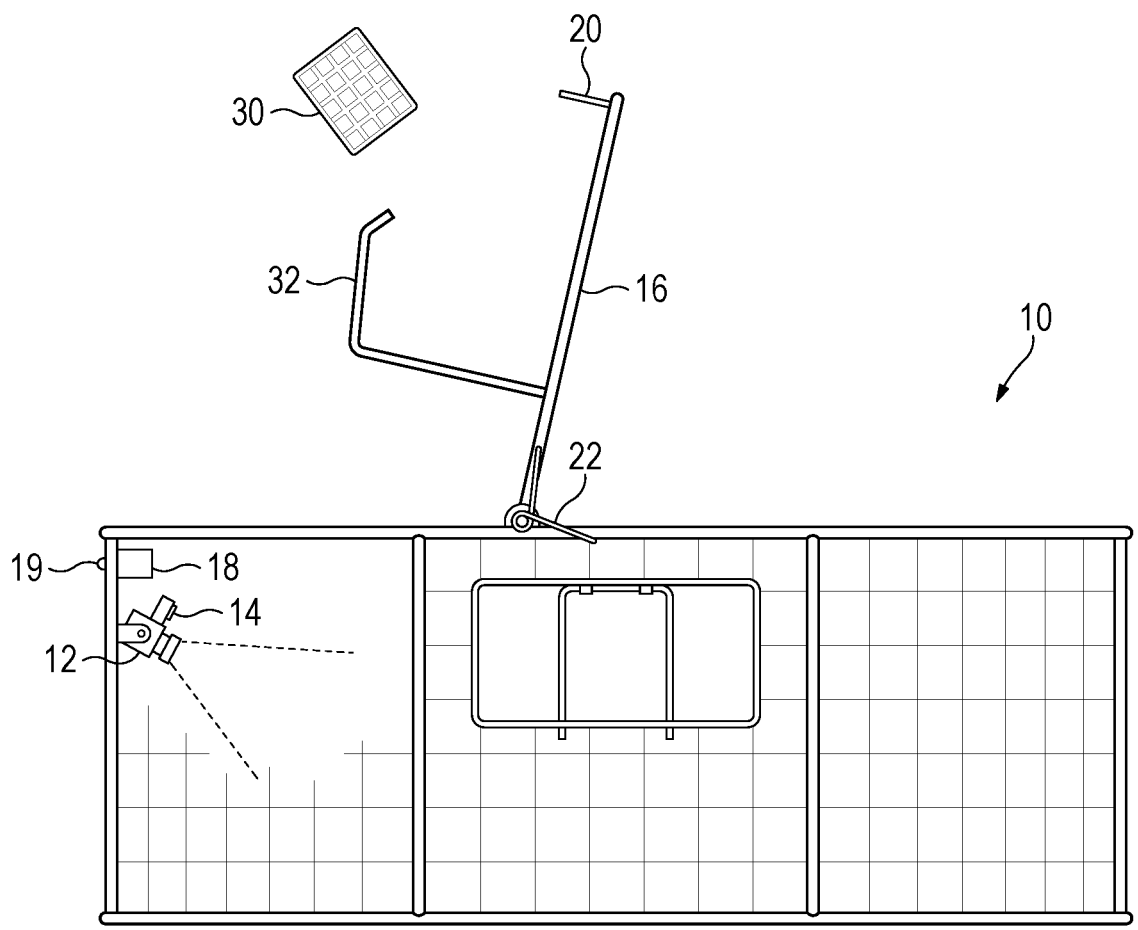
FIG. 2 is a side view of the marine life trap of FIG. 1, in the process of ejecting the bait box.

Referring to FIGS. 1 and 2 In a preferred embodiment, a trap 10, includes a camera 12, and a light flash mechanism 14 that is tuned to have a maximum reflectance from a particular species of protected crabs, for example Blue King Crabs. Accordingly, when a trap 10 contains a Blue King Crab, this crab will appear brightly illuminated and therefore clearly distinguishable from any other crab. In an alternate embodiment, camera 12 includes a light filter that is tuned to the protected crustacean, blocking light other than those wavelengths that maximally reflect from the protected crustacean. When this is found, the person examining the images may send a signal, by reverse course, to the buoy which will relay it to trap 10, to open the trap door 16. (All crab traps or pots are currently equipped with doors, which can be opened to remove the caught crabs). In this embodiment, the door latch is remotely operable to permit the door 16 to swing open. In a preferred embodiment, a solenoid 18 causes a pin 19 to be withdrawn from a door hasp 20, and the door 16 is urged by a spring 22, to swing open when unopposed. In a further embodiment, a bait cage 30 inside the trap 10 is equipped with a similar latched spring mechanism (not shown), or held by a holder 32, that is part of door 16 whereby when the pin 19 is withdrawn, any bait remaining in the bait cage is ejected from the trap 10, by action of the spring 22 acting on door 16. In one preferred embodiment, in which the bait cage 30 is not supported by a part of the door 16, the spring action is amplified by way of a lever arm, to form a bait catapult. By ejecting the bait, any protected species crabs are thereby encouraged to leave the trap 10, so that it can be the more readily retrieved.

Figure 3:
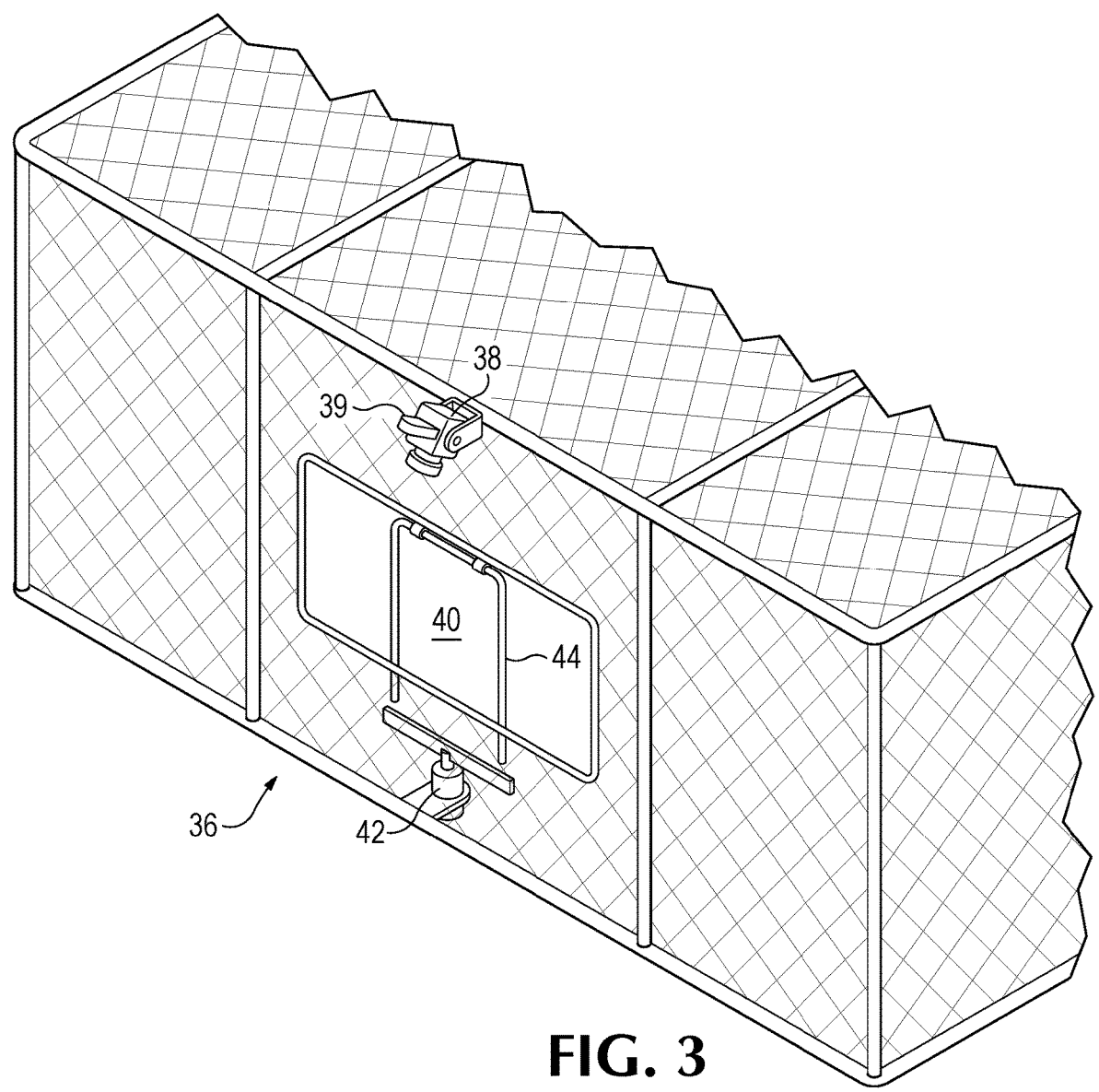
FIG. 3 is a partial isometric view of a crab pot, showing a controllably open entry.
Figure 5:
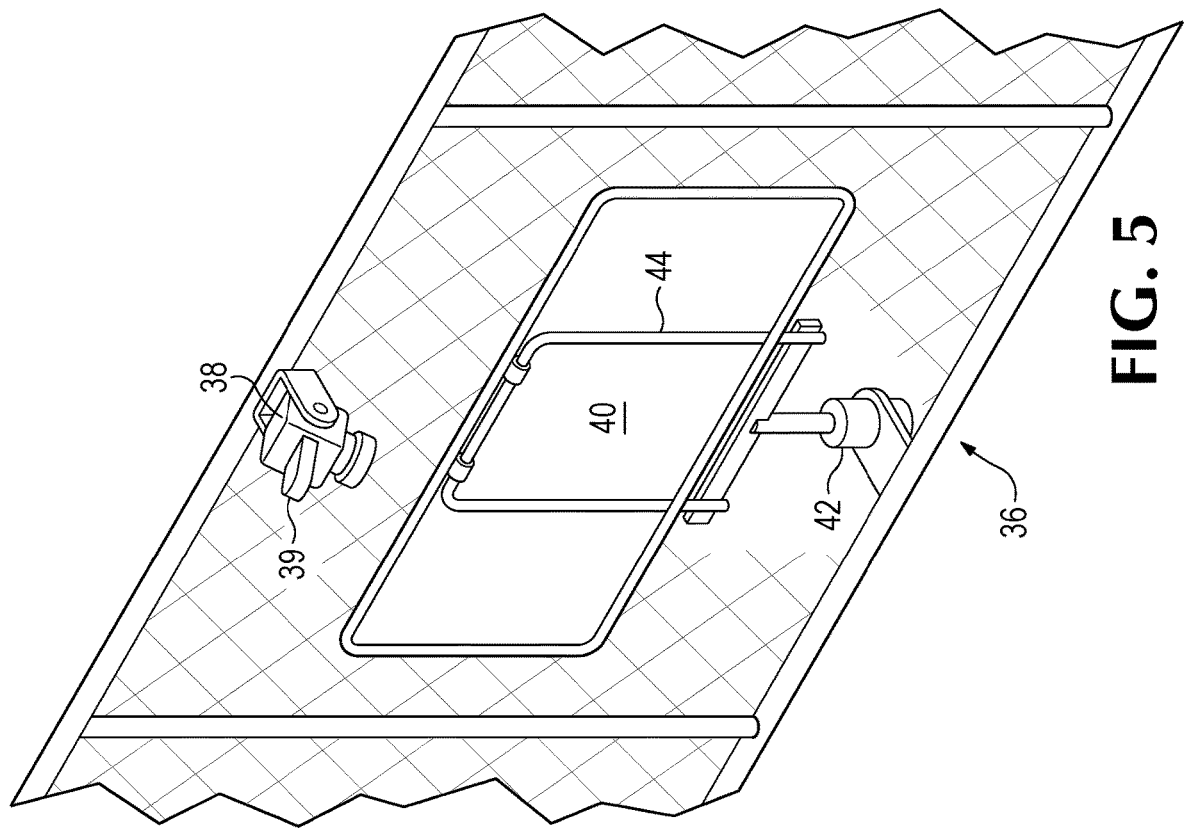
FIG. 5 is a partial isometric view of the crab port of FIG. 3, showing the entry in its closed mode.
Figure 4:
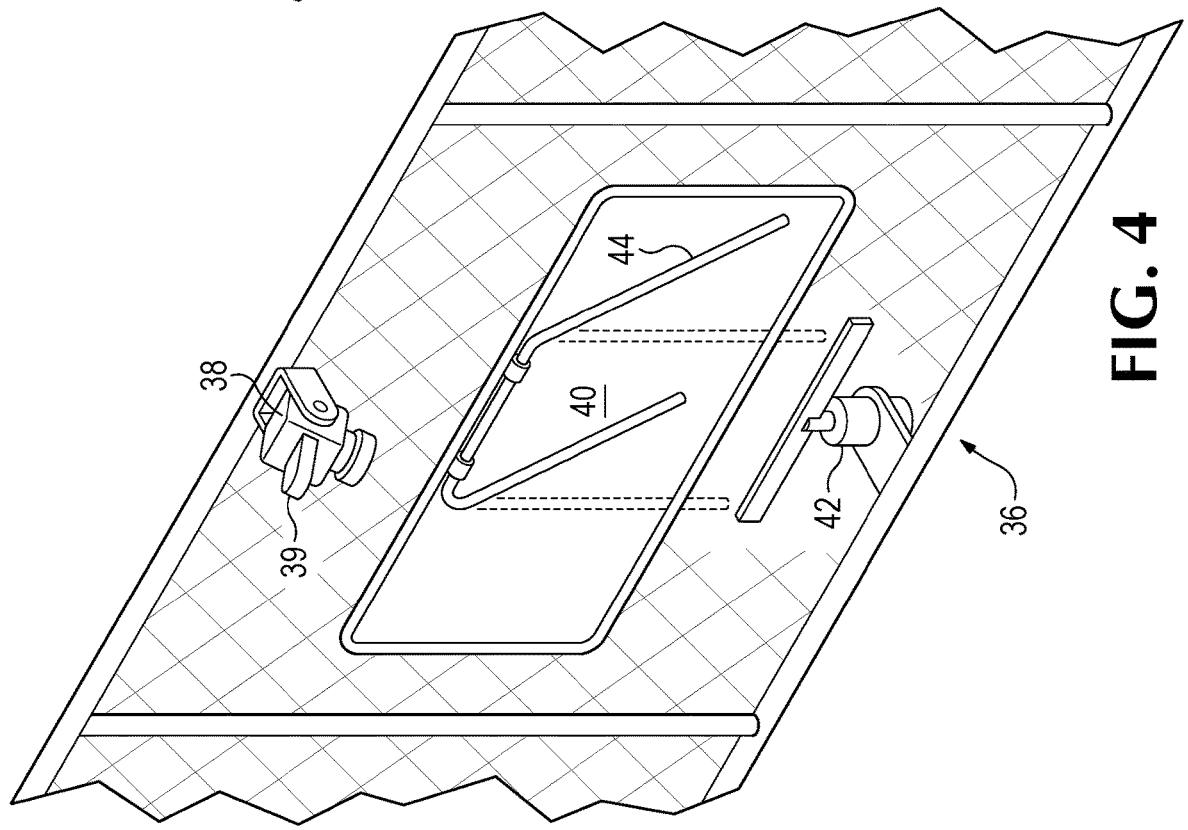
FIG. 4 is a partial isometric view of the crab pot of FIG. 3, showing the entry in its open mode.

Referring now to FIGS. 3-5, In a further preferred embodiment a trap 36, includes an image forming assembly that includes a camera 38 that has a field of view that includes the area immediately outside a closeable crustacean entrance 40, and a light flash mechanism 39 aimed at the same area. In one embodiment, camera 38 and light flash mechanism 39 are activated simultaneously to form an image of the camera field of view. This imagery is sent to a remote station for analysis, to determine if a crustacean is approaching entrance 40. If image analysis shows that a protected crab is approaching, a first signal is sent to trap 36, causing an actuator 42 to block a closure 44, as shown in FIG. 5, to stop the crab from entering the trap 10. FIGS. 3 and 4 show the trap in a state that permits the entrance 40 to open. If the protected crab leaves the area, a second signal will cause the actuator 42 to unblock closure 44, permitting unprotected crustaceans to enter trap 36. This trap 36 can be connected to the buoy system noted above, for communication to a remote station. At the remote station, the imagery gathered may be displayed to user, who makes the decision to open or close entrance 40. In another embodiment, the decision is made automatically by a computer. In alternative embodiments, a decision to use the light flash mechanism 39 is made based on preliminary images made without using mechanism 39, but with another light source or no light source, to detect that some creature is approaching the entrance 40. In one embodiment, the image forming assembly is tuned to Blue King crabs. In one embodiment, mechanism 39 emits light that is tuned to the protected species. In another embodiment, camera 38 includes a light filter that permits passage of light reflected from the protected species, so that it responds more strongly to light reflected from the protected species.

There are some species of protected crabs which may be brought to the surface and released. In the decision of where to lay down more traps, areas with high concentrations of these crabs may be avoided, because catching them creates a greater crab sorting burden.

Although the above process has been described with respect to crabs, it may also be used for the harvesting of other valuable crustaceans, for example lobsters. When used for lobsters, the grid distances given above may be adjusted to better fit known models of lobster harvesting.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of harvesting crustaceans in an area where there is a protected crustacean species, comprising:
 a. providing a trap having;
  i. a crustacean entrance that can be closed to prevent entry responsive to a signal received at said trap;

ii. an image forming assembly including a digital camera and a flash mechanism, said assembly being directed at an area immediately outside of said entrance and being tuned to return a maximum signal from crustaceans of said protected crustacean species so that a protected species crustacean appears as brightly lit in images formed;

b. providing a communications assembly connecting said trap to a remote station that is equipped to receive images from said assembly;

c. laying out said trap in the ocean;

d. repeatedly lighting said area with said flash mechanism and forming images with said digital camera and sending said images to said remote station;

e. monitoring said images and performing an analysis on each said image at said remote station, to determine if a crustacean of a protected crustacean species is approaching said trap; and f. in reliance on said images, when a crustacean of said protected crustacean species is detected in said area, sending said signal to said trap so that said entrance is closed, thereby preventing said protected crustacean from entering said trap.

2. The method of claim 1, wherein said crustaceans are crabs.

3. The method of claim 1, wherein said image forming assembly is tuned to Blue King Crabs.

4. The method of claim 1, wherein said image forming assembly is tuned to return a maximum signal from crustaceans of said protected crustacean species, because said flash mechanism emits a light that maximally reflects from said protected crustacean species.

5. The method of claim 1, wherein said image forming assembly is tuned to return a maximum signal from crustaceans of said protected crustacean species, because said camera includes a light filter that permits passage of light reflected from said protected species, so that it responds more strongly to light reflected from said protected species.

6. The method of claim 1, wherein said remote station includes a display screen to display said images to a human user, and wherein said human user performs said analysis and causes said signal to be sent to said trap.

7. The method of claim 1, wherein said remote station includes a signal processor and logic device, and wherein said signal processor and said logic device performs said analysis and causes said signal to be sent to said trap.

8. The method of claim 1, wherein said communication assembly includes a buoy connected by an electrical conductor to said trap, said buoy further equipped with a radio transceiver, permitting radio communication to a further communications element, which is in communication with said remote station.

9. The method of claim 1, wherein said signal is a first signal, and wherein a second signal causes said entrance to open.

10. A crustacean trap adapted to permit blocking entry to a crustacean of a protected species, comprising:

a. a cage, enclosing a volume;

b. a crustacean entrance that can be closed to prevent entry, responsive to a first signal and opened to permit crustacean entry, responsive to a second signal received at said trap;

c. an image forming assembly including a digital camera and a flash mechanism, said assembly being directed at an area immediately outside of said entrance and being tuned to return a maximum signal from crustaceans of said protected crustacean species so that a protected species crustacean appears as brightly lit in images returned; and d. a connector for connecting said cage to a signal source for receiving said first and second signals and for sending said images formed.

11. The crustacean trap of claim 10, wherein said image forming assembly is tuned to Blue King Crabs.

12. The crustacean trap of claim 10, further being a crab trap.

13. The crustacean trap of claim 10, wherein said image forming assembly is tuned to return a maximum signal from crustaceans of said protected crustacean species, because said flash mechanism emits a light that maximally reflects from said protected crustacean species.

14. The crustacean trap of claim 10, wherein said image forming assembly is tuned to return a maximum signal from crustaceans of said protected crustacean species, because said camera includes a light filter that permits passage of light reflected from said protected species, so that it responds more strongly to light reflected from said protected species.

15. A system for catching permitted crustaceans and avoiding catching protected crustaceans comprising:

a. a crustacean trap adapted to permit blocking entry to a crustacean of a protected species, comprising:

i. a cage, enclosing a volume;

ii. a crustacean entrance that can be closed to prevent entry, responsive to a first signal and opened to permit crustacean entry, responsive to a second signal received at said trap; and iii. an image forming assembly including a digital camera and a flash mechanism, said assembly being directed at an area immediately outside of said entrance and being tuned to return a maximum signal from crustaceans of said protected crustacean species so that a protected species crustacean appears as brightly lit in images formed;

b. a remote station adapted to permit analysis of said images and for sending said first and second signals, responsive to said analysis; and c. a communications assembly for permitting images from said image forming assembly to be sent to said remote station and first signals and second signals to be received from said remote station.

16. The system of claim 15, wherein said crustaceans are crabs.

17. The system of claim 15, wherein said image forming assembly is tuned to Blue King Crabs.

18. The system of claim 15, wherein said remote station includes a display screen to display said images to a human user, and a user input, to permit a human user to assess said images and enter a first command into said user input causing a first signal to be sent to said trap and to enter a second command into said user input, causing a second signal to be sent to said trap.

19. The system of claim 15, wherein said remote station includes a signal processor and logic device, and wherein said signal processor and said logic device performs said analysis and causes said first signals and said second signals to be sent to said trap.

20. The system of claim 15, wherein said communication assembly includes a buoy connected by an electrical conductor to said trap, said buoy further equipped with a radio transceiver, permitting radio communication to a further communications element, which is in communication with said remote station.

\* \* \* \* \*